(12) United States Patent
Wang et al.

(10) Patent No.: US 11,778,604 B2
(45) Date of Patent: Oct. 3, 2023

(54) MAC-CE FOR JOINT SIDELINK TCI AND POWER CONTROL CONFIGURATION

(71) Applicant: QUALCOMM Incorporated, San Diego, CA (US)

(72) Inventors: Hua Wang, Basking Ridge, NJ (US); Sony Akkarakaran, Poway, CA (US); Tao Luo, San Diego, CA (US); Junyi Li, Fairless Hills, PA (US); Yan Zhou, San Diego, CA (US); Hong Cheng, Basking Ridge, NJ (US); Jelena Damnjanovic, Del Mar, CA (US); Peter Gaal, San Diego, CA (US); Jung Ho Ryu, Fort Lee, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 262 days.

(21) Appl. No.: 17/479,179

(22) Filed: Sep. 20, 2021

(65) Prior Publication Data

US 2023/0106952 A1    Apr. 6, 2023

(51) Int. Cl.
*H04W 72/04* (2023.01)
*H04W 72/044* (2023.01)
*H04W 72/20* (2023.01)

(52) U.S. Cl.
CPC ....... *H04W 72/0473* (2013.01); *H04W 72/20* (2023.01)

(58) Field of Classification Search
None
See application file for complete search history.

(56) References Cited

U.S. PATENT DOCUMENTS

| | | | |
|---|---|---|---|
| 2021/0045070 A1* | 2/2021 | Yi | H04W 72/0446 |
| 2021/0051510 A1* | 2/2021 | Chae | H04B 17/318 |
| 2021/0051594 A1* | 2/2021 | Chae | H04W 80/02 |
| 2021/0105055 A1* | 4/2021 | Chae | H04L 5/0026 |
| 2021/0212086 A1* | 7/2021 | Li | H04W 72/569 |
| 2022/0077982 A1* | 3/2022 | Zhang | H04L 5/0014 |
| 2022/0086843 A1* | 3/2022 | Ying | H04W 72/046 |
| 2022/0110138 A1* | 4/2022 | Miao | H04L 1/0072 |
| 2022/0110143 A1* | 4/2022 | Ganesan | H04W 4/46 |
| 2022/0131645 A1* | 4/2022 | Miao | H04L 1/08 |
| 2022/0248415 A1* | 8/2022 | Ding | H04L 1/0025 |
| 2022/0272706 A1* | 8/2022 | Sengupta | H04W 52/18 |

(Continued)

FOREIGN PATENT DOCUMENTS

WO    WO-2022240750 A1 * 11/2022

*Primary Examiner* — Kodzovi Acolatse
(74) *Attorney, Agent, or Firm* — Procopio, Cory, Hargreaves & Savitch LLP

(57) ABSTRACT

A user equipment (UE) may receive, from at least one of a base station or a configuring UE, a configuration of a plurality of sidelink power control parameter sets, a media access control (MAC) control element (CE) (MAC-CE) activating transmission configuration indicator (TCI) states and indicating sidelink power control parameter sets, and control information indicating a TCI state and a sidelink power control parameter set. The UE may transmit the sidelink communication in a direction based on the TCI state and with a transmission power indicated in the control information. The MAC-CE may include a joint MAC-CE or separate MAC-CEs to update or configuration of the sidelink TCI and the power control parameters.

30 Claims, 14 Drawing Sheets

(56) References Cited

U.S. PATENT DOCUMENTS

| | | | | |
|---|---|---|---|---|
| 2022/0330038 | A1* | 10/2022 | Ganesan | H04W 52/10 |
| 2022/0353823 | A1* | 11/2022 | Chae | H04L 5/0055 |
| 2023/0171705 | A1* | 6/2023 | Go | H04W 52/54 |
| | | | | 370/318 |
| 2023/0180132 | A1* | 6/2023 | Wang | H04W 16/28 |
| | | | | 370/318 |

* cited by examiner

| | | Oct 1 | Oct 2 | Oct 3 | | Oct N | |
|---|---|---|---|---|---|---|---|
| | | BWP ID | $T_0$ | $T_8$ | | $T_{(N-2) \times 8}$ | |
| | | | $T_1$ | $T_9$ | | $T_{(N-2) \times 8+1}$ | |
| | | Serving Cell ID | $T_2$ | $T_{10}$ | | $T_{(N-2) \times 8+2}$ | |
| | | | $T_3$ | $T_{11}$ | • | $T_{(N-2) \times 8+3}$ | |
| | | | $T_4$ | $T_{12}$ | • | $T_{(N-2) \times 8+4}$ | |
| | | | $T_5$ | $T_{13}$ | • | $T_{(N-2) \times 8+5}$ | |
| | | | $T_6$ | $T_{14}$ | | $T_{(N-2) \times 8+6}$ | |
| | | R | $T_7$ | $T_{15}$ | | $T_{(N-2) \times 8+7}$ | |

FIG. 5

MAC-CE FOR JOINT SIDELINK TCI AND POWER CONTROL CONFIGURATION

TECHNICAL FIELD

The present disclosure relates generally to communication systems, and more particularly, to a method of wireless communication including media access control (MAC) control element (CE) (MAC-CE) for configuring sidelink TCI and power control.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a sidelink user equipment (UE) and a base station. The UE may receive, from at least one of the base station or a configuring UE, a configuration of a plurality of sidelink power control parameter sets, a media access control (MAC) control element (CE) (MAC-CE) activating transmission configuration indicator (TCI) states and indicating sidelink power control parameter sets, and control information indicating the TCI states and a sidelink power control parameter set. The UE may transmit the sidelink communication in a direction based on the TCI state and with a transmission power indicated in the control information. The MAC-CE may include a joint MAC-CE or separate MAC-CEs to update or configuration of the sidelink TCI and the power control parameters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 illustrates examples of resource reservation for sidelink communication.

DETAILED DESCRIPTION

Figure 1:
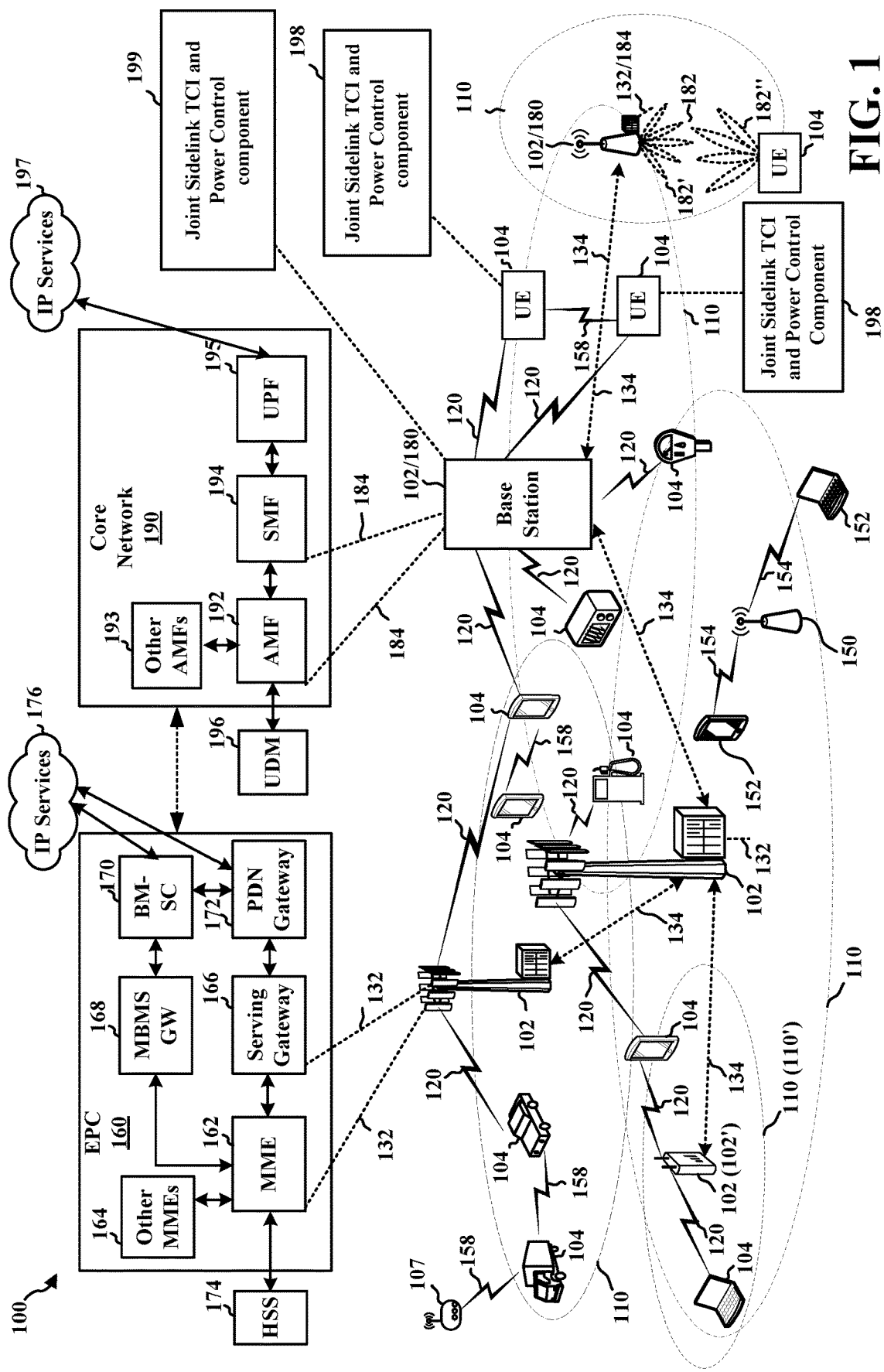
FIG. 1 is a diagram illustrating an example of a wireless communications system and an access network.

Aspects presented herein enable a UE to employ improved power control for sidelink communication, such as for sidelink communication in a beam direction based on a TCI state. UE may receive, from at least one of a base station or a configuring UE, a configuration of a plurality of sidelink power control parameter sets. The UE may receive a MAC-CE activating one or more TCI states and indicating sidelink power control parameter sets. The UE may then receive control information indicating a TCI state and a corresponding sidelink power control parameter set. Based on the control information, the UE may transmit the sidelink communication in a direction based on the TCI state and with the transmission power indicated in the control information.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a UE 104, or other device communicating based on sidelink, may include a joint sidelink TCI and power control component 198 configured to transmit or receive at least one MAC-CE activating one or more TCI states and indicating one or more sidelink power control parameter sets, transmit or receive control information indicating a TCI state and a power control parameter set from the at least one MAC-CE, and transmit sidelink communication in a direction based on the TCI state indicated in the control information and with a transmission power based on the sidelink power control parameter set indicated in the control information. In certain aspects, the base station 180 may include a joint sidelink TCI and power control component 199 configured to configure a plurality of sidelink power control parameter sets and a plurality of TCI states for a UE to communicate via sidelink; and transmit, to the UE, at least one MAC-CE activating one or more of the plurality of TCI states and one or more sidelink power control parameter sets of the plurality of sidelink power control parameter sets. Although the following description may be focused on 5G NR, the concepts described herein may be applicable to other similar areas, such as LTE, LTE-A, CDMA, GSM, and other wireless technologies.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR2-2, FR4, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
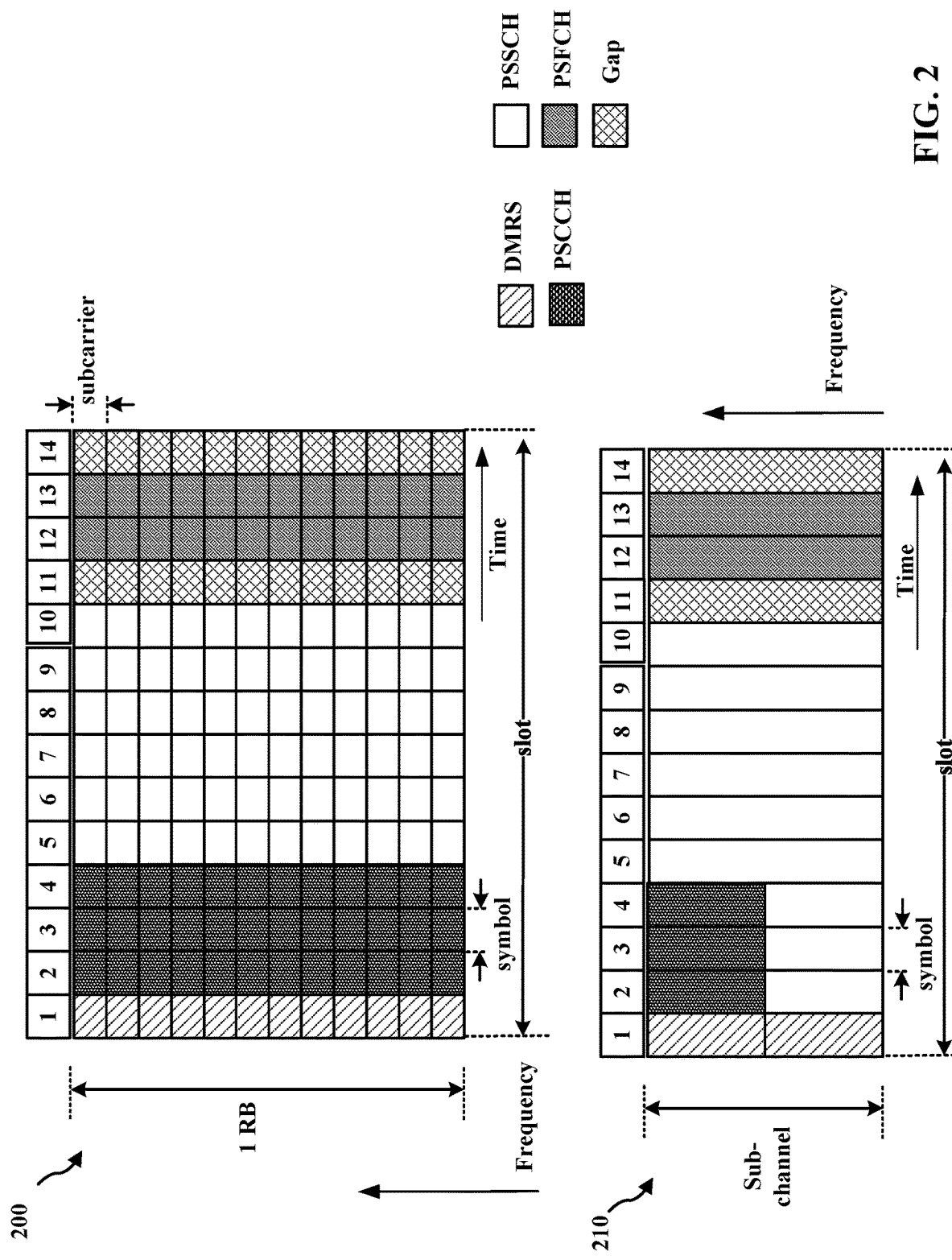
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
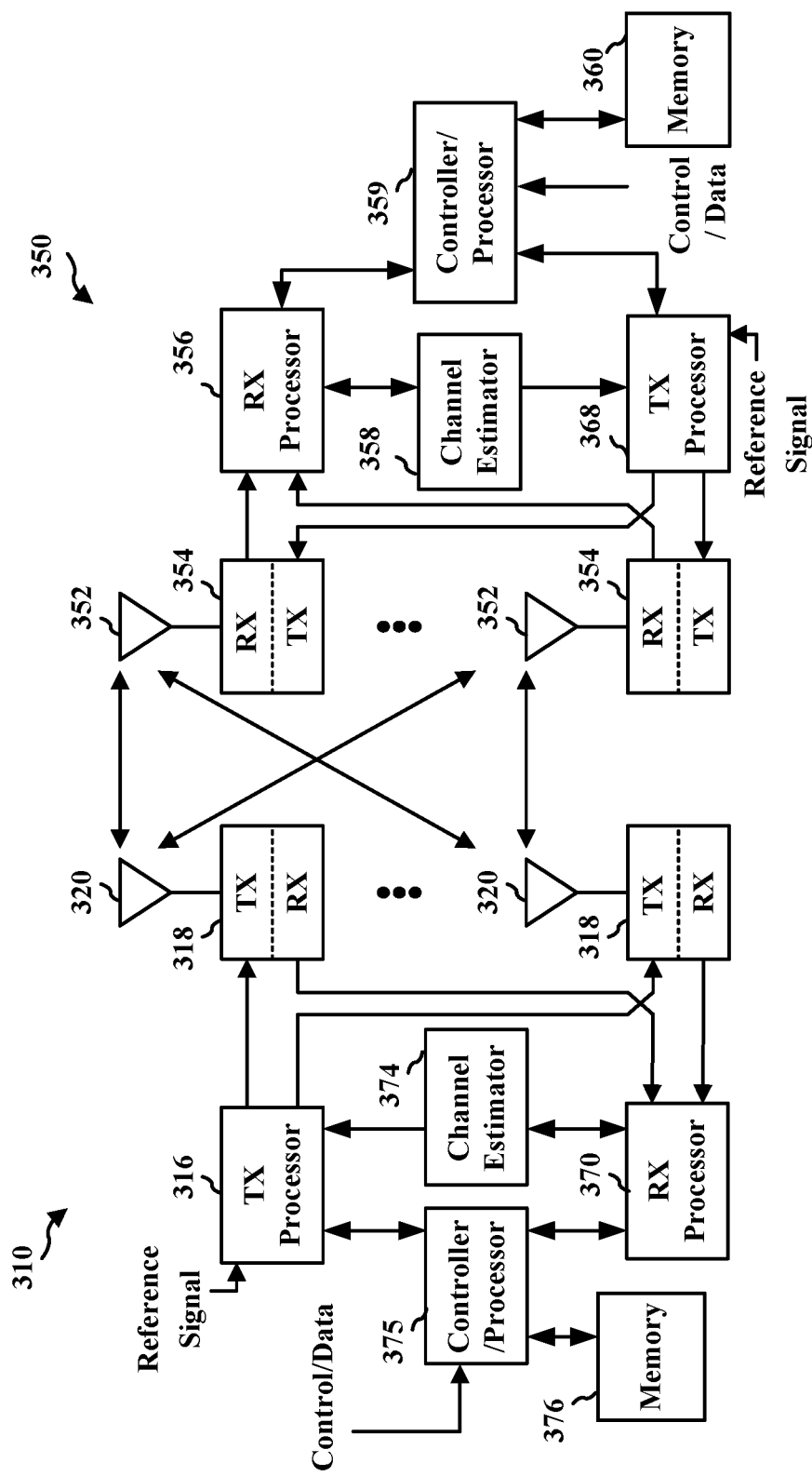
FIG. 3 is a diagram illustrating an example of a first device and a second device involved in wireless communication based, e.g., on sidelink.

FIG. 3 is a block diagram of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 198 or 199 of FIG. 1.

Figure 4:
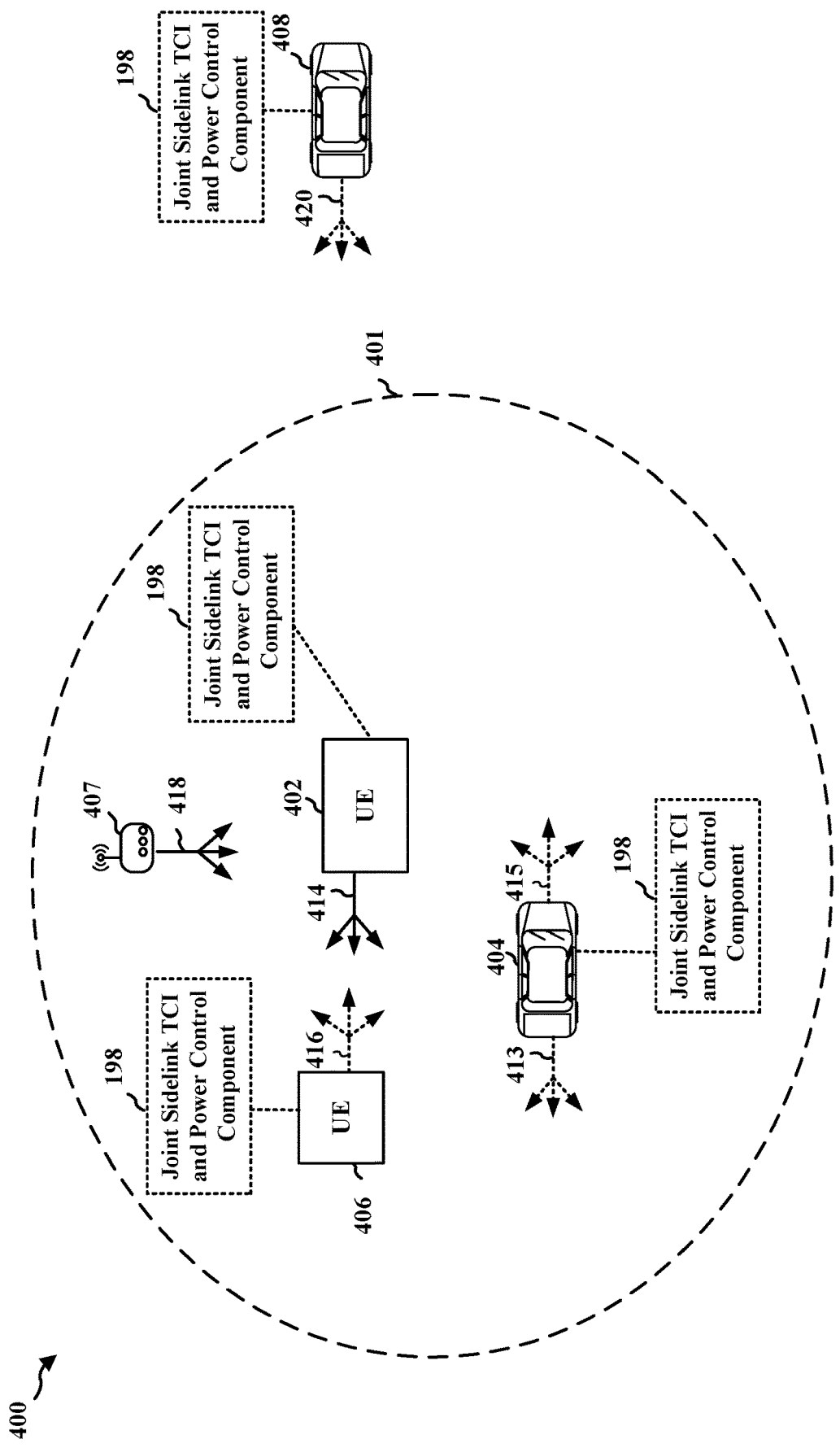
FIG. 4 illustrates example aspects of sidelink communication between devices, in accordance with aspects presented herein.

FIG. 4 illustrates an example 400 of sidelink communication between devices. The communication may be based on a slot structure comprising aspects described in connection with FIG. 2. For example, the UE 402 may transmit a sidelink transmission 414, e.g., comprising a control channel (e.g., PSCCH) and/or a corresponding data channel (e.g., PSSCH), that may be received by UEs 404, 406, 408. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 402, 404, 406, 408 may each be capable of sidelink transmission in addition to sidelink reception. Thus, UEs 404, 406, 408 are illustrated as transmitting sidelink transmissions 413, 415, 416, 420. The sidelink transmissions 413, 414, 415, 416, 420 may be unicast, broadcast or multicast to nearby devices. For example, UE 404 may transmit communication 413, 415 intended for receipt by other UEs within a range 401 of UE 404, and UE 406 may transmit communication 416. Additionally or alternatively, RSU 407 may receive communication from and/or transmit communication 418 to UEs 402, 404, 406, 408. One or more of the UEs 402, 404, 406, 408 or the RSU 407 may comprise a joint sidelink TCI and power control component 198 as described in connection with FIG. 1.

Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from a configuring UE that includes reservation information based on a resource reservation field comprised in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from the configuring UE, the reservations may also be received from an RSU or other device communicating based on sidelink.

FIG. 5 is a diagram illustrating an example MAC-CE 500 that may be received by a UE. The MAC-CE 500 may include a bitmap indicating at least one sidelink TCI state is activated for the UE, and a serving cell ID and/or a BWP ID for which the MAC-CE 500 may apply. That is, the MAC-CE 500 may include a variable size bitmap including a CORESET pool ID (R) field, a serving cell ID field, a BWP ID field, or sidelink TCI state fields. For example, a first octet (Oct) of the MAC-CE bitmap may include the CORESET pool ID, the serving cell ID, or the BWP ID.

The CORESET pool ID may indicate whether a mapping between the activated sidelink TCI states and a codepoint of the DCI or the SCI may be specified or based on a preconfigured rule. For example, the length of the CORESET pool ID may be 1 bit. The serving cell ID may indicate the identity of the serving cell for which the MAC-CE 500 may apply. For example, the length of the serving cell ID field may be 5 bits. The BWP ID may indicate a DL BWP for which the MAC-CE 500 may apply as the codepoint. For example, the length of the BWP ID field may be 2 bits.

The remaining octets may be a bitmap of the sidelink TCI states, each bit corresponding to each sidelink TCI state. If a bit is set to 1, then the corresponding sidelink TCI state may be activated. For example, the base station may configure up to 128 sidelink TCI states, and the bitmap may have a bit length of 128 bits. In one aspect, the MAC-CE 500 may include up to 8 bits set to 1, and MAC-CE 500 may activate up to 8 sidelink TCI states based on the corresponding bits of the bitmap.

The activated sidelink TCI state(s) may be applied to reception/transmission types or resources. That is, the activated sidelink TCI states may indicate one or more sidelink data transmission types or resources to which the activated sidelink TCI states may be applied. For example, the sidelink data transmission types or resources may include a PSBCH, a PSDCH, a PSSCH, or a PSCCH. The applicable sidelink transmission type/resource per activated sidelink TCI state may be determined via various options. In one aspect, the applicable sidelink transmission types/resources may be described in a specification (i.e., predetermined). For example, it may be predetermined that the activated sidelink TCI state can be applied to all sidelink transmission types/resources in a component carrier (CC) where the MAC-CE 500 may be applied.

In one aspect, the applicable sidelink transmission types and/or resources may be configured or indicated by the base station, for example, via RRC/MAC-CE/DCI or the configuring UE, for example, via MAC-CE/SCI. In one example, the base station may indicate that one activated sidelink TCI state can be applied to at least one of PSBCH, a PSDCH, a PSSCH, or a PSCCH in the CC where the MAC-CE 500 may be applied. In another example, the configuring UE may indicate that one activated sidelink TCI state can be applied to at least one of PSBCH, a PSDCH, a PSSCH, or a PSCCH in the CC where the MAC-CE 500 may be applied.

In some aspects, if multiple sidelink TCI states can be activated by the MAC-CE, the UE may receive control information, e.g., DCI or SCI, indicating a TCI codepoint mapped to one activated sidelink TCI state. That is, a TCI codepoint field in the DCI received from the base station or the SCI received from the configuring UE may include TCI codepoint indexes, respectively mapped to one of the activated sidelink TCI states. The base station may transmit a DCI to the UE, and the TCI codepoint field of the DCI may indicate the TCI codepoint index mapped to an activated sidelink TCI state among the activated multiple sidelink TCI states. The configuring UE may transmit the SCI to the UE, and the TCI codepoint field of the SCI may indicate the TCI codepoint index mapped to an activated sidelink TCI state among the activated multiple sidelink TCI states.

The UE may receive the TCI codepoint carried in the DCI or the SCI, and the at least one sidelink TCI state activated by the MAC-CE 500 may be sequentially mapped to candidate TCI codepoints indicated in the DCI or the SCI. That is, the sidelink TCI states activated by the MAC-CE may be sequentially mapped to each bit of the TCI codepoints associated with the indexes of the TCI codepoints. The UE may transmit sidelink communication in a direction based on the sidelink TCI state corresponding to the TCI codepoint, the sidelink TCI state selected among the activated sidelink TCIs by the MAC-CE 500.

In some aspects, the MAC-CE 500 may activate the sidelink TCI states associated with sidelink TCI state IDs 5, 7, and 9, and the activated sidelink TCI states may be sequentially mapped to TCI codepoints with values of 0, 1, 2. That is, the MAC-CE 500 may activate sidelink TCI state $T_5$, $T_7$, and $T_9$, and they may be sequentially mapped to bits of TCI codepoints associated with the index 0, 1, and 2 of the TCI codepoints. For example, the bitmap of the MAC-CE 500 may provide that the bits corresponding to the sidelink TCI state IDs $T_1$, $T_4$, $T_{10}$, and T15 are 1, indicating that the sidelink TCI states corresponding to the sidelink TCI state IDs $T_1$, $T_4$, $T_{10}$, and T15 are activated or configured. The UE may subsequently receive the DCI from the base station or the SCI from the configuring UE including the codepoint of 001 for sidelink communication, the UE may apply the sidelink TCI state corresponding with the TCI ID 4, which is the second activated sidelink TCI state.

A UE may perform power control to determine a transmission power for transmissions by the UE. The UE may perform an open loop power control, e.g., a non-beam based power control. Aspects presented herein provide for improved sidelink power control that may be signaled in a more dynamic manner to the UE and which may be applied by the UE for transmissions in a particular beam direction.

For example, a UE may receive a MAC-CE that indicates one or more power control parameter sets. The UE may further receive control information, e.g., DCI and/or SCI that indicates one of the power control parameter sets from the MAC-CE. For example, the codepoint of the DCI/SCI may correspond to a TCI state and a power control parameter set from at least one prior MAC-CE.

In some aspects, the MAC-CE may include a joint MAC-CE that activates the TCI states(s) from an RRC configuration and indicates power control parameter set(s). In some aspects, the UE may receive separate MAC-CEs to update or configure the sidelink TCI and the power control parameters. Here, the joint or separate MAC-CE may be transmitted using the Uu interface between the UE and the base station or the sidelink communication between UEs.

Figure 6:
FIG. 6 is a diagram illustrating a MAC-CE of wireless communication

FIG. 6 is a diagram illustrating a MAC-CE 600 of wireless communication. The MAC-CE 600 may be a separate MAC-CE to update or configure the sidelink power control parameters separate from, or independent of, a MAC-CE that updates/activates the sidelink TCI states. The MAC-CE 600 may include a plurality of power control parameter set IDs for updating the power control parameter of a UE and a serving cell ID and/or a BWP ID for which the MAC-CE 500 may apply. That is, the MAC-CE 600 may include a variable size bitmap including a CORESET pool ID (R) field, a serving cell ID field, a BWP ID field, or plurality of power control parameter set IDs. For example, a first octet (Oct) of the MAC-CE bitmap may include the CORESET pool ID, the serving cell ID, or the BWP ID.

The CORESET pool ID may indicate whether a mapping between the configured sidelink power control parameters and a codepoint of the DCI or the SCI may be specified or based on a preconfigured rule. For example, the length of the CORESET pool ID may be 1 bit. The serving cell ID may indicate the identity of the serving cell for which the MAC-CE 600 may apply. For example, the length of the serving cell ID field may be 5 bits. The BWP ID may indicate a DL BWP for which the MAC-CE 600 may apply as the codepoint. For example, the length of the BWP ID field may be 2 bits.

The remaining octets may represent the plurality of power control parameter set IDs. Each of the power parameter set ID may correspond to a power control parameter set. The power control set may include plurality of power control parameter IDs including at least one of a sidelink pathloss reference signal Id (e.g., sl-pathlossReferenceRS-Id), a sidelink p0 ID (e.g., sl-p0-Id), or a sidelink alpha Id (e.g., sl-alpha-ID). Each of the plurality of power control parameter IDs may correspond to a plurality of power control parameter values. That is, the sidelink pathloss reference signal Id (e.g., sl-pathlossReferenceRS-Id) may indicate the sidelink pathloss reference signal parameter value, the sidelink p0 ID may indicate the sidelink p0 parameter value, and the sidelink alpha Id may indicate the sidelink alpha parameter value.

For example, the UE may determine a power $P_{PSSCH}^{,b,c}(i)$ for a PSSCH transmission on a resource pool in symbols where a corresponding PSCCH is not transmitted in PSCCH-PSSCH transmission occasion i on active SL BWP b of carrier f of serving cell c as: $P_{PSSCH}(i)=\min(P_{CMAX}, P_{MAX}^{CBR} \min(P_{PSSCH}^{,D}(i), P_{PSSCH}^{,SL}(i)))$ [Bm], wherein the $P_{PSSCH}^{,SL}(i)$ may be determined based on the sidelink p0 parameter value $P_{O,SL}$ indicated by the sidelink p0 ID (e.g., sl-p0-Id) and the sidelink alpha parameter value $\alpha_{SL}$ indicated by the sidelink alpha Id. For example, the $P_{PSSCH}^{,SL}$ may be determined as $P_{PSSCH}^{,SL}(i)=P_O^{,SL}+10 \log_{10}(2\mu \cdot M_{RB}^{PSSCH}(i))+\alpha_{SL} \cdot PL_{SL}$ [dBm]. Here, the parameter values corresponding to each of the IDs included in the power control set may be configured by the Uu interface between the UE and the base station or the sidelink communication between UEs.

The UE may receive the codepoint carried in the DCI or the SCI, and the plurality of sidelink power control parameter set IDs configured by the MAC-CE 600 may be sequentially mapped to one of the codepoints indicated in the DCI or the SCI. That is, the plurality of sidelink power control parameter set IDs configured by the MAC-CE may be sequentially mapped to each bit of the codepoints associated with the indexes of the codepoints. The UE may transmit sidelink communication based on the sidelink power control parameters associated with the sidelink power control parameter ID corresponding to the codepoint, the sidelink power control parameter ID selected among the plurality of sidelink power control parameter IDs configured by the MAC-CE 600.

In some aspects, the MAC-CE 600 may configure the plurality of power control parameter set IDs including k power control parameter set IDs, power control parameter set ID 0, power control parameter set ID 1, . . . , power control parameter set ID (k–1), and the plurality of power control parameter set IDs may be sequentially mapped to codepoints with values of 0, 1, 2, . . . , (k–1). For example, the UE may receive the DCI from the base station or the SCI from the configuring UE including the codepoint of 001 for power control of the sidelink communication, and the UE may apply the sidelink power control parameters corresponding with the power control parameter set ID 1.

Figure 7:
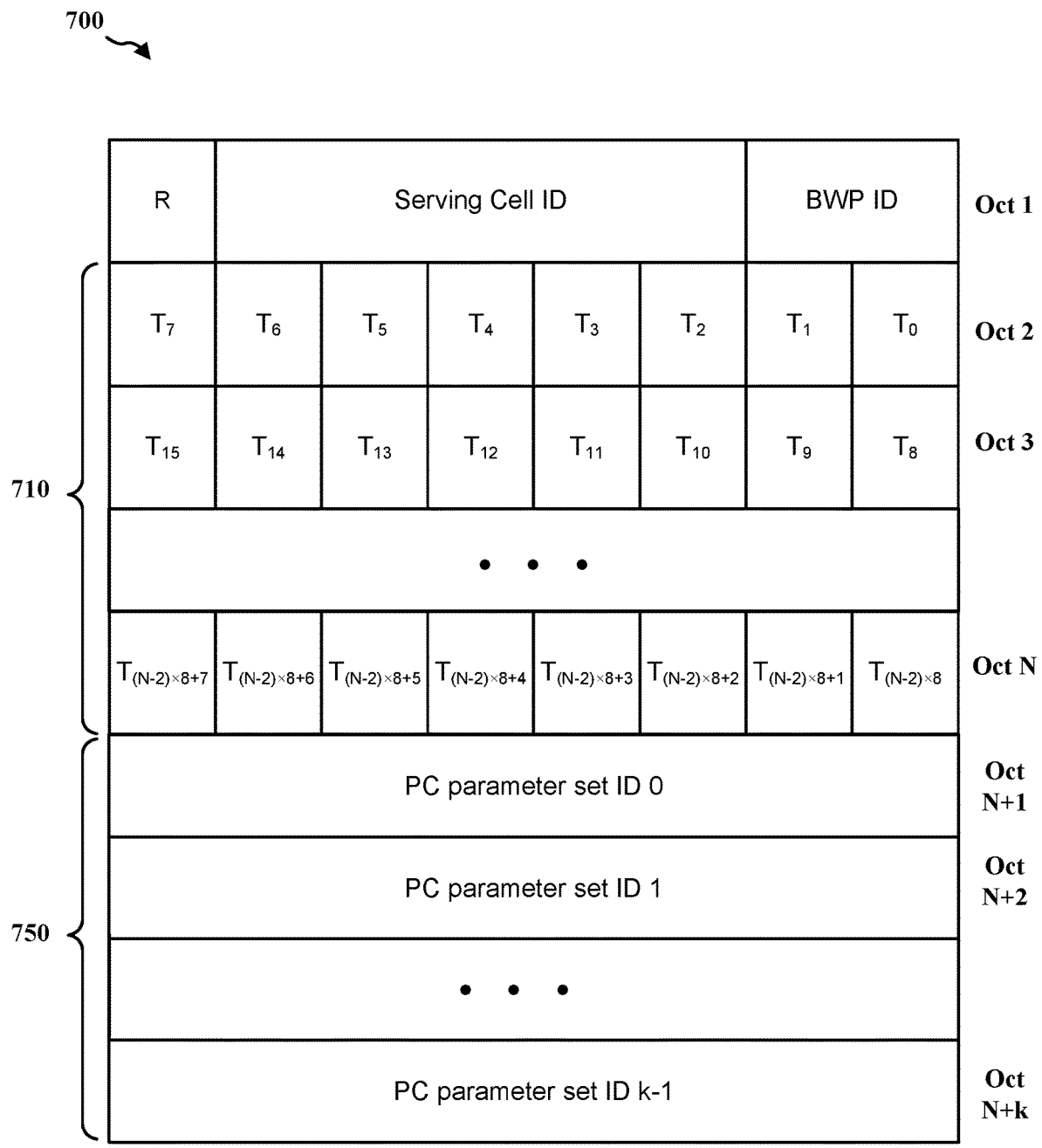
FIG. 7 is a diagram illustrating a MAC-CE of wireless communication.

FIG. 7 is a diagram illustrating a MAC-CE 700 of wireless communication. The MAC-CE 700 illustrates example aspects of a joint MAC-CE to update or activate a set of one or more sidelink TCI states and to indicate one or more power control parameter sets. The MAC-CE 700 may include a bitmap 710 indicating which at least one sidelink TCI state may be activated, a plurality of power control parameter set IDs 750 for updating the power control parameter of a UE, and a serving cell ID and/or a BWP ID for which the MAC-CE 700 may apply. That is, the MAC-CE 700 may include a variable size bitmap including a CORESET pool ID (R) field, a serving cell ID field, a BWP ID field, sidelink TCI state fields, or a plurality of power control parameter set IDs. For example, a first octet (Oct) of the MAC-CE bitmap may include the CORESET pool ID, the serving cell ID, or the BWP ID.

The CORESET pool ID may indicate whether a mapping between the activated sidelink TCI states and the configured sidelink power control parameters, and a codepoint of the DCI or the SCI may be specified or based on a preconfigured rule. For example, the length of the CORESET pool ID may be 1 bit. The serving cell ID may indicate the identity of the serving cell for which the MAC-CE 700 may apply. For example, the length of the serving cell ID field may be 5 bits. The BWP ID may indicate a DL BWP for which the MAC-CE 700 may apply as the codepoint. For example, the length of the BWP ID field may be 2 bits.

The subsequent N–1 octets (from octet 2 to octet N) may be a bitmap of the sidelink TCI states, each bit corresponding to each sidelink TCI state. If a bit is set to 1, then the corresponding sidelink TCI state may be activated. For example, the base station may configure up to 128 sidelink TCI states, e.g., in RRC signaling, and the bitmap for the MAC-CE may have a bit length comprising up to 128 bits. In one aspect, the MAC-CE 700 may include up to 8 bits set to 1, and MAC-CE 700 may activate up to 8 sidelink TCI states based on the corresponding bits of the bitmap.

The activated sidelink TCI state(s) may be activated for particular reception/transmission types or resources. That is, the activated sidelink TCI states may indicate one or more sidelink data transmission types or resources to which the activated sidelink TCI states may be applied. For example, the sidelink data transmission types or resources may include a PSBCH, a PSDCH, a PSSCH, or a PSCCH. The applicable sidelink transmission type/resource per activated sidelink TCI state may be determined via various options. In one aspect, the applicable sidelink transmission types/resources may be described in a specification (i.e., predetermined). For example, it may be predetermined that the activated sidelink TCI state can be applied to all sidelink transmission types/resources in a component carrier (CC) for which the MAC-CE 700 may be applied.

In one aspect, the applicable sidelink transmission types and/or resources may be configured or indicated by the base station, for example, via RRC/MAC-CE/DCI or the configuring UE, for example, via MAC-CE/SCI. In one example, the base station may indicate that one activated sidelink TCI state can be applied to at least one of PSBCH, a PSDCH, a PSSCH, or a PSCCH in the CC where the MAC-CE 700 may be applied. In another example, the configuring UE may indicate that one activated sidelink TCI state can be applied to at least one of PSBCH, a PSDCH, a PSSCH, or a PSCCH in the CC where the MAC-CE 700 may be applied.

The subsequent k octets (from octet N+1 to octet N+k) may represent the plurality of power control parameter set IDs. Each of the power parameter set ID may correspond to a power control parameter set. The power control parameter set may include plurality of power control parameter IDs including at least one of a sidelink pathloss reference signal Id (e.g., sl-pathlossReferenceRS-Id), a sidelink p0 ID (e.g., sl-p0-Id), or a sidelink alpha Id (e.g., sl-alpha-ID). Each of the plurality of power control parameter IDs may correspond to a plurality of power control parameter values. That is, the sidelink pathloss reference signal Id (e.g., sl-pathlossReferenceRS-Id) may indicate the sidelink pathloss reference signal parameter value, the sidelink p0 ID may indicate the sidelink p0 parameter value, and the sidelink alpha Id may indicate the sidelink alpha parameter value. Here, the parameter values corresponding to each of the IDs included in the power control parameter set may be configured by the Uu interface between the UE and the base station or the sidelink communication between UEs.

The UE may receive a codepoint carried in DCI or in SCI that indicates one of the sidelink TCI states activated by the MAC-CE 700 and an associated power control parameter set from the MAC-CE. The DCI/SCI codepoint may be sequentially mapped to candidate TCI codepoints of the MAC-CE. Also, the plurality of sidelink power control parameter set IDs configured by the MAC-CE 700 may be sequentially mapped to one of the codepoints indicated in the DCI or the SCI. That is, the plurality of sidelink power control parameter set IDs and the plurality of sidelink power control parameter set IDs configured by the MAC-CE may be jointly and sequentially mapped to each bit of the codepoints associated with the indexes of the codepoints. The UE may transmit sidelink communication in a direction based on the sidelink TCI state and using a transmission power based on the sidelink power control parameters associated with the sidelink power control parameter ID corresponding to the codepoint, the sidelink TCI state selected among the activated sidelink TCIs by the MAC-CE 700 and the sidelink power control parameter ID selected among the plurality of sidelink power control parameter IDs configured by the MAC-CE 700.

In some aspects, the MAC-CE 700 may provide that the bits corresponding to the sidelink TCI state IDs $T_1$, $T_4$, $T_{10}$, and $T_{15}$ are 1, indicating that the sidelink TCI states corresponding to the sidelink TCI state IDs $T_1$, $T_4$, $T_{10}$, and $T_{15}$ are activated or configured. The MAC-CE 700 may further configure the plurality of power control parameter set IDs including k power control parameter set IDs, power control parameter set ID 0, power control parameter set ID 1, . . . , power control parameter set ID (k−1), and the plurality of power control parameter set IDs may be sequentially mapped to codepoints with values of 0, 1, 2, . . . , (k−1).

For example, the UE may receive the DCI from the base station or the SCI from the configuring UE including the codepoint of 001 for the joint configuration of the sidelink TCI state and the power control of the sidelink communication, and the UE may apply the sidelink power control parameters corresponding with the power control parameter set ID 1 and the second power control parameter set associated with the power control parameter ID based on the received codepoint of 001. The UE may, based on the codepoint of 001 received via the DCI or the SCI, jointly apply the sidelink TCI state corresponding to the TCI state ID $T_4$ and the sidelink power control parameters associated with the power control parameter ID 1, based on the codepoint of 001 received via the DCI from the base station or the SCI from the configuring UE.

Figure 8:
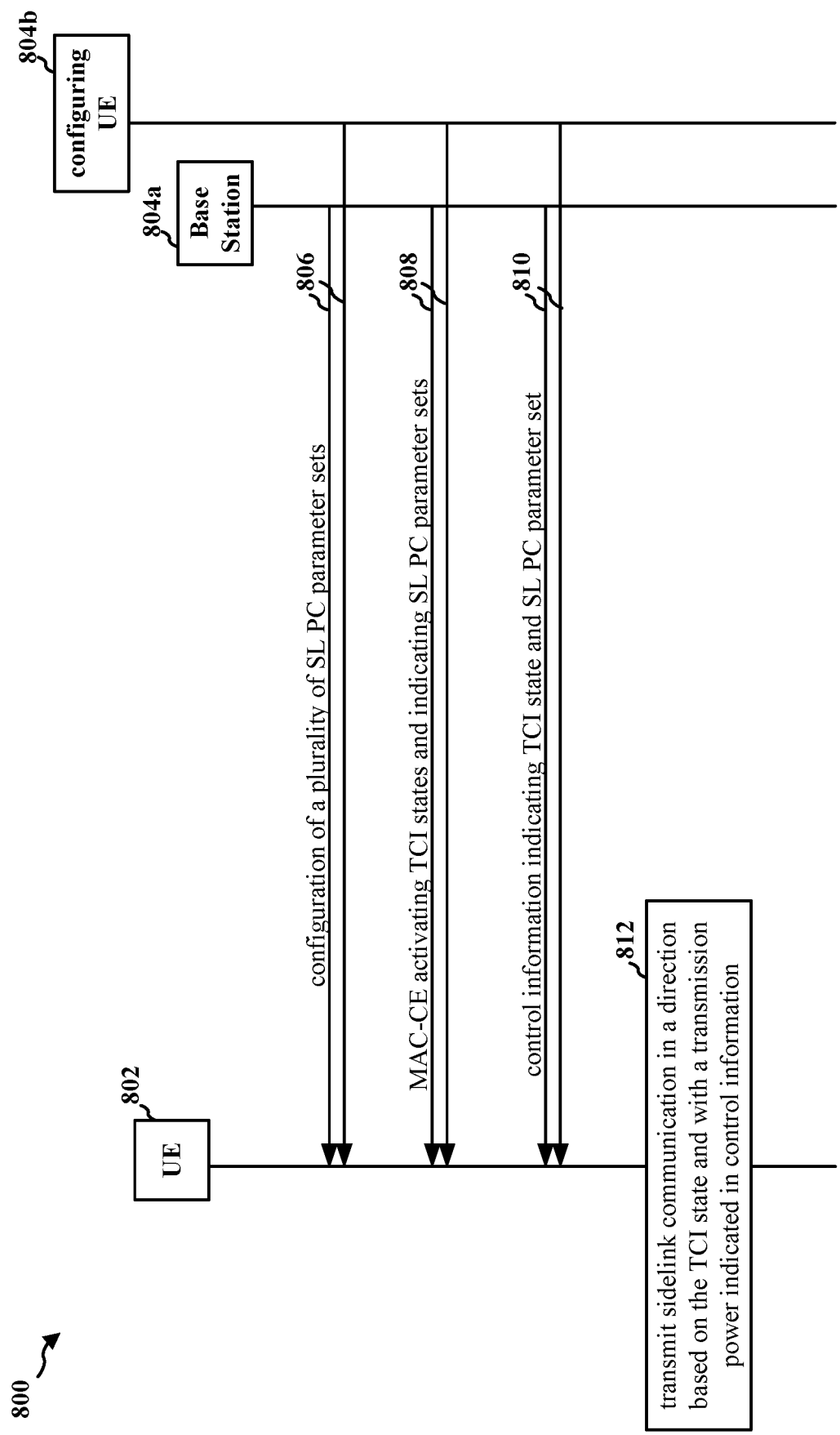
FIG. 8 is a diagram illustrating a MAC-CE of wireless communication.

FIG. 8 is a call flow diagram 800 of wireless communication. The call flow diagram 800 may include a UE 802 and a base station 804*a* or a configuring UE 804*b*. The UE 802 may receive, from at least one of a base station 804*a* or the configuring UE 804*b*, a configuration of a plurality of sidelink power control parameter sets, a MAC-CE activating TCI states and indicating sidelink power control parameter sets, and control information indicating a TCI state and a sidelink power control parameter set. The UE 802 may transmit sidelink communication in a direction based on the TCI state and with a transmission power indicated in the control information.

For example, at 806, the base station 804*a* or the configuring UE 804*b* may configure a plurality of sidelink power control parameter sets and a plurality of TCI states for a UE to communicate via sidelink. The configuration of the TCI states and the power control parameter sets may be transmitted to the UE in RRC signaling, in some aspects. The configuration of the TCI states and the power control parameter sets may be received in separate RRC message or may be received in a single RRC message. The UE 802 may receive a configuration of a plurality of sidelink power control parameter sets, where the one or more sidelink power control parameter sets may be updated or activated from the plurality of sidelink power control parameter sets configured for the UE based on the at least one MAC-CE. The configuration of the plurality of sidelink parameter sets may include the parameter values corresponding to each of the IDs included in the power control parameter set configured by the Uu interface between the UE and the base station or the sidelink communication between UEs.

At 808, the base station 804*a* or the configuring UE 804*b* may transmit, to the UE 802, at least one MAC-CE activating one or more of the plurality of previously configured TCI states and one or more of the previously configured sidelink power control parameter sets. The MAC-CE may activate, update, or otherwise indicate, a subset of the TCI states and/or power control parameter sets configured for the UE, e.g., in RRC signaling. The UE 802 may receive at least one MAC-CE activating one or more TCI states and indicating one or more sidelink power control parameter sets. In one aspect, the at least one MAC-CE may be transmitted from the configuring UE 804*b*, and the UE 802 may receive the at least one MAC-CE in a PSSCH. In another aspect, the at least one MAC-CE may be transmitted from the base station 804*a*, and the UE 802 may receive the at least one MAC-CE in a PDSCH. In one aspect, the at least one MAC-CE may be a joint MAC-CE that activates the one or more TCI states and indicates the one or more sidelink power control parameter sets. In another aspect, the at least one MAC-CE may include a first MAC-CE activating the one or more TCI states and a second MAC-CE indicating the one or more sidelink power control parameter sets.

In some aspects, each sidelink power control parameter set may be indicated with a sidelink power control parameter ID that is associated with at least one of a sidelink power control parameter set ID, a sidelink power control pathloss reference signal ID, a sidelink p0 ID, or a sidelink alpha ID. That is, the power control parameter set may include plurality of power control parameter IDs including at least one of a sidelink pathloss reference signal Id (e.g., sl-pathloss- ReferenceRS-Id), a sidelink p0 ID (e.g., sl-p0-Id), or a sidelink alpha Id (e.g., sl-alpha-ID). Each of the plurality of power control parameter IDs may correspond to a plurality of power control parameter values. That is, the sidelink pathloss reference signal Id (e.g., sl-pathlossReferenceRS-Id) may indicate the sidelink pathloss reference signal parameter value, the sidelink p0 ID may indicate the sidelink p0 parameter value, and the sidelink alpha Id may indicate the sidelink alpha parameter value. Here, at 806, the parameter values corresponding to each of the IDs included in the power control parameter set may be configured by the Uu interface between the UE and the base station or the sidelink communication between UEs.

At 810, the base station 804a or the configuring UE 804b may transmit control information, e.g., DCI or SCI, indicating a TCI state and a power control parameter set for the UE to apply from the subsets activated/updated by the at least one MAC-CE. The UE 802 may receive the control information indicating a TCI state and a power control parameter set from the at least one MAC-CE. In one aspect, the control information may include a codepoint that indicates the TCI state from the one or more TCI states activated by the at least one MAC-CE and indicates the power control parameter set from the one or more sidelink power control parameter sets indicated in the at least one MAC-CE. In one aspect, the control information may be transmitted from the configuring UE 804b, and the UE 802 may receive the control information in SCI. In another aspect, the control information may be transmitted from the base station 804a, and the UE 802 may receive the control information in DCI.

At 812, the UE 802 may transmit sidelink communication in a direction based on the TCI state indicated in the control information and with a transmission power based on the sidelink power control parameter set indicated in the control information. That is, the UE 802 may be configured to transmit the sidelink communication based on the TCI state and the sidelink power control parameter set. In one aspect, the UE 802 may transmit the sidelink communication in the direction based on the TCI state indicated in the control information. In another aspect, the UE 802 may transmit the sidelink communication with a transmission power based on the sidelink power control parameter set indicated in the control information.

Figure 9:
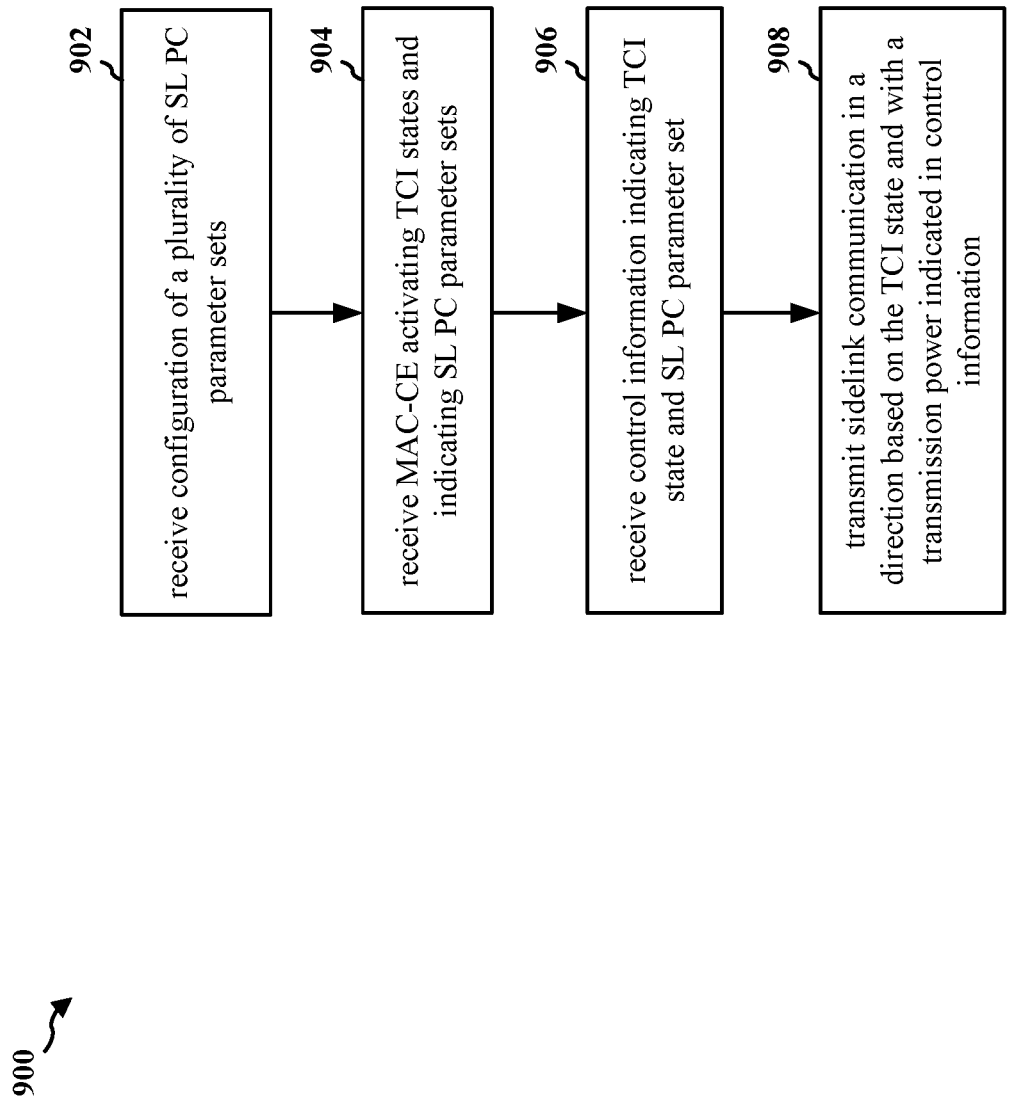
FIG. 9 is a flowchart of a method of wireless communication.

FIG. 9 is a flowchart of a method 900 of wireless communication. The method may be performed at a UE (e.g., the UE 104, 402, 802; the device 350; the apparatus 1302). In some aspects, the method may be performed by the apparatus 1302 in FIG. 13, which includes memory and at least one processor, the apparatus including one or more components configured to perform the aspects of the method 900. The UE may receive, from at least one of a base station or a configuring UE, a configuration of a plurality of sidelink power control parameter sets, a MAC-CE activating TCI states and indicating sidelink power control parameter sets, and control information indicating a TCI state and a sidelink power control parameter set. The UE may transmit sidelink communication in a direction based on the TCI state and with a transmission power indicated in the control information.

At 902, the UE may receive a configuration of a plurality of sidelink power control parameter sets. The one or more sidelink power control parameter sets may be updated or activated from the plurality of sidelink power control parameter sets configured for the UE based on the at least one MAC-CE. The configuration of the plurality of sidelink parameter sets may include the parameter values corresponding to each of the IDs included in the power control parameter set configured by the Uu interface between the UE and the base station or the sidelink communication between UEs. For example, at 806, the UE 802 may receive a configuration of a plurality of sidelink power control parameter sets. Furthermore, 902 may be performed by a sidelink power control parameter configuring component 1340.

At 904, the UE may receive at least one MAC-CE activating one or more TCI states and indicating one or more sidelink power control parameter sets. In one aspect, the at least one MAC-CE may be transmitted from the configuring UE 804b, and the UE 802 may receive the at least one MAC-CE in a PSSCH. In another aspect, the at least one MAC-CE may be transmitted from the base station 804a, and the UE 802 may receive the at least one MAC-CE in a PDSCH. In one aspect, the at least one MAC-CE may be a joint MAC-CE that activates the one or more TCI states and indicate the one or more sidelink power control parameter sets. In another aspect, the at least one MAC-CE may include a first MAC-CE activating the one or more TCI states and a second MAC-CE indicating the one or more sidelink power control parameter sets. For example, at 808, the UE 802 may receive at least one MAC-CE activating one or more TCI states and indicating one or more sidelink power control parameter sets. Furthermore, 904 may be performed by a MAC-CE component 1342.

In some aspects, each sidelink power control parameter set may be indicated with a sidelink power control parameter ID that is associated with at least one of a sidelink power control parameter set ID, a sidelink power control pathloss reference signal ID, a sidelink p0 ID, or a sidelink alpha ID. That is, the power control parameter set may include plurality of power control parameter IDs including at least one of a sidelink pathloss reference signal Id (e.g., sl-pathlossReferenceRS-Id), a sidelink p0 ID (e.g., sl-p0-Id), or a sidelink alpha Id (e.g., sl-alpha-ID). Each of the plurality of power control parameter IDs may correspond to a plurality of power control parameter values. That is, the sidelink pathloss reference signal Id (e.g., sl-pathlossReferenceRS-Id) may indicate the sidelink pathloss reference signal parameter value, the sidelink p0 ID may indicate the sidelink p0 parameter value, and the sidelink alpha Id may indicate the sidelink alpha parameter value. Here, at 806, the parameter values corresponding to each of the IDs included in the power control parameter set may be configured by the Uu interface between the UE and the base station or the sidelink communication between UEs.

At 906, the UE may receive control information indicating a TCI state and a power control parameter set from the at least one MAC-CE. In one aspect, the control information may include a codepoint that indicates the TCI state from the one or more TCI states activated by the at least one MAC-CE and indicates the power control parameter set from the one or more sidelink power control parameter sets indicated in the at least one MAC-CE. In one aspect, the control information may be transmitted from the configuring UE, and the UE 802 may receive the control information in SCI. In another aspect, the control information may be transmitted from the base station 804a, and the UE 802 may receive the control information in DCI. For example, at 810, the UE 802 may receive control information indicating a TCI state and a power control parameter set from the at least one MAC-CE. Furthermore, 906 may be performed by a control information component 1344.

At 908, the UE may transmit sidelink communication in a direction based on the TCI state indicated in the control information and with a transmission power based on the sidelink power control parameter set indicated in the control information. That is, the UE may be configured to transmit the sidelink communication based on the TCI state and the sidelink power control parameter set. In one aspect, the UE may transmit the sidelink communication in the direction based on the TCI state indicated in the control information. In another aspect, the UE 802 may transmit the sidelink communication with a transmission power based on the sidelink power control parameter set indicated in the control information. For example, at 812, the UE 802 may transmit sidelink communication in a direction based on the TCI state indicated in the control information and with a transmission power based on the sidelink power control parameter set indicated in the control information. Furthermore, 908 may be performed by a sidelink communication managing component 1346.

Figure 10:
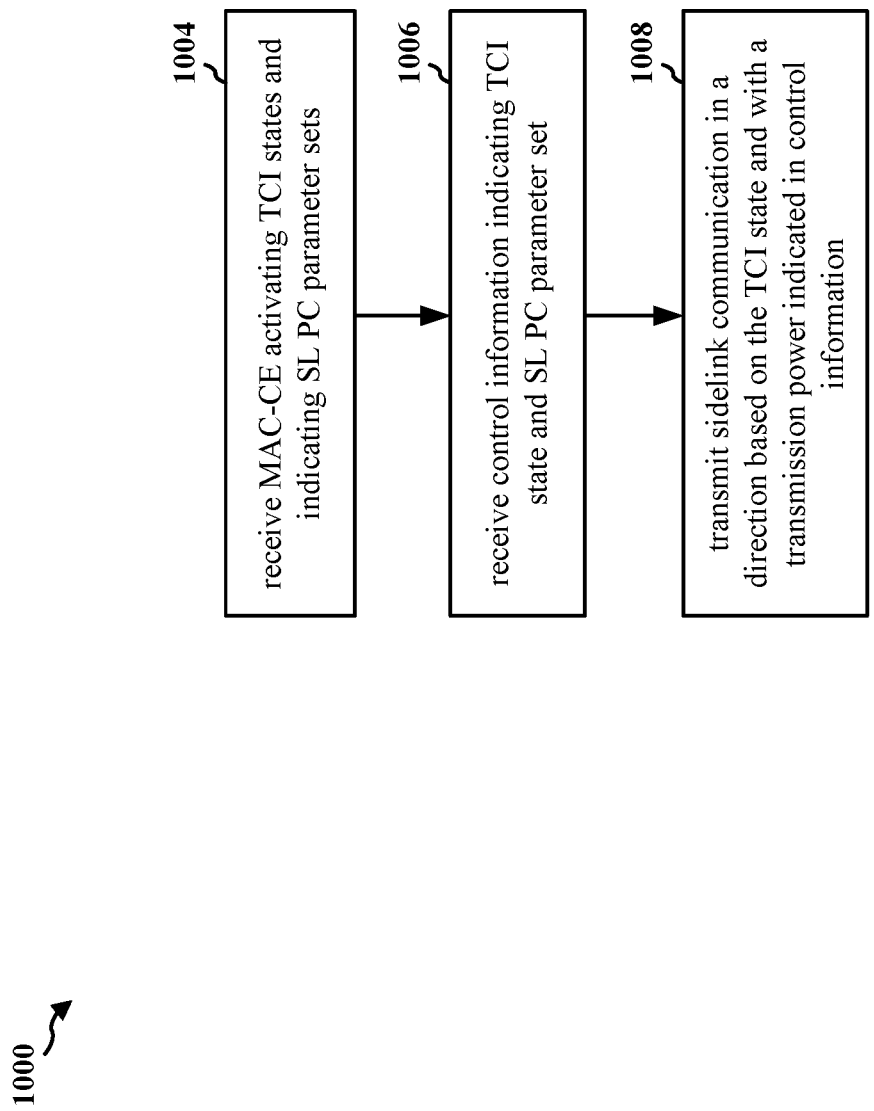
FIG. 10 is a flowchart of a method of wireless communication.

FIG. 10 is a flowchart 1000 of a method of wireless communication. The method may be performed by a UE (e.g., the UE 104; the apparatus 1302). The UE may receive, from at least one of a base station or a configuring UE, a configuration of a plurality of sidelink power control parameter sets, a MAC-CE activating TCI states and indicating sidelink power control parameter sets, and control information indicating a TCI state and a sidelink power control parameter set. The UE may transmit sidelink communication in a direction based on the TCI state and with a transmission power indicated in the control information.

At 1004, the UE may receive at least one MAC-CE activating one or more TCI states and indicating one or more sidelink power control parameter sets. In one aspect, the at least one MAC-CE may be transmitted from the configuring UE 804b, and the UE 802 may receive the at least one MAC-CE in a PSSCH. In another aspect, the at least one MAC-CE may be transmitted from the base station 804a, and the UE 802 may receive the at least one MAC-CE in a PDSCH. In one aspect, the at least one MAC-CE may be a joint MAC-CE that activates the one or more TCI states and indicate the one or more sidelink power control parameter sets. In another aspect, the at least one MAC-CE may include a first MAC-CE activating the one or more TCI states and a second MAC-CE indicating the one or more sidelink power control parameter sets. For example, at 808, the UE 802 may receive at least one MAC-CE activating one or more TCI states and indicating one or more sidelink power control parameter sets. Furthermore, 1004 may be performed by a MAC-CE component 1342.

In some aspects, each sidelink power control parameter set may be indicated with a sidelink power control parameter ID that is associated with at least one of a sidelink power control parameter set ID, a sidelink power control pathloss reference signal ID, a sidelink p0 ID, or a sidelink alpha ID. That is, the power control parameter set may include plurality of power control parameter IDs including at least one of a sidelink pathloss reference signal Id (e.g., sl-pathlossReferenceRS-Id), a sidelink p0 ID (e.g., sl-p0-Id), or a sidelink alpha Id (e.g., sl-alpha-ID). Each of the plurality of power control parameter IDs may correspond to a plurality of power control parameter values. That is, the sidelink pathloss reference signal Id (e.g., sl-pathlossReferenceRS-Id) may indicate the sidelink pathloss reference signal parameter value, the sidelink p0 ID may indicate the sidelink p0 parameter value, and the sidelink alpha Id may indicate the sidelink alpha parameter value. Here, at 806, the parameter values corresponding to each of the IDs included in the power control parameter set may be configured by the Uu interface between the UE and the base station or the sidelink communication between UEs.

At 1006, the UE may receive control information indicating a TCI state and a power control parameter set from the at least one MAC-CE. In one aspect, the control information may include a codepoint that indicates the TCI state from the one or more TCI states activated by the at least one MAC-CE and indicates the power control parameter set from the one or more sidelink power control parameter sets indicated in the at least one MAC-CE. In one aspect, the control information may be transmitted from the configuring UE, and the UE 802 may receive the control information in SCI. In another aspect, the control information may be transmitted from the base station 804a, and the UE 802 may receive the control information in DCI. For example, at 810, the UE 802 may receive control information indicating a TCI state and a power control parameter set from the at least one MAC-CE. Furthermore, 1006 may be performed by a control information component 1344.

At 1008, the UE may transmit sidelink communication in a direction based on the TCI state indicated in the control information and with a transmission power based on the sidelink power control parameter set indicated in the control information. That is, the UE may be configured to transmit the sidelink communication based on the TCI state and the sidelink power control parameter set. In one aspect, the UE may transmit the sidelink communication in the direction based on the TCI state indicated in the control information. In another aspect, the UE 802 may transmit the sidelink communication with a transmission power based on the sidelink power control parameter set indicated in the control information. For example, at 812, the UE 802 may transmit sidelink communication in a direction based on the TCI state indicated in the control information and with a transmission power based on the sidelink power control parameter set indicated in the control information. Furthermore, 1008 may be performed by a sidelink communication managing component 1346.

Figure 11:
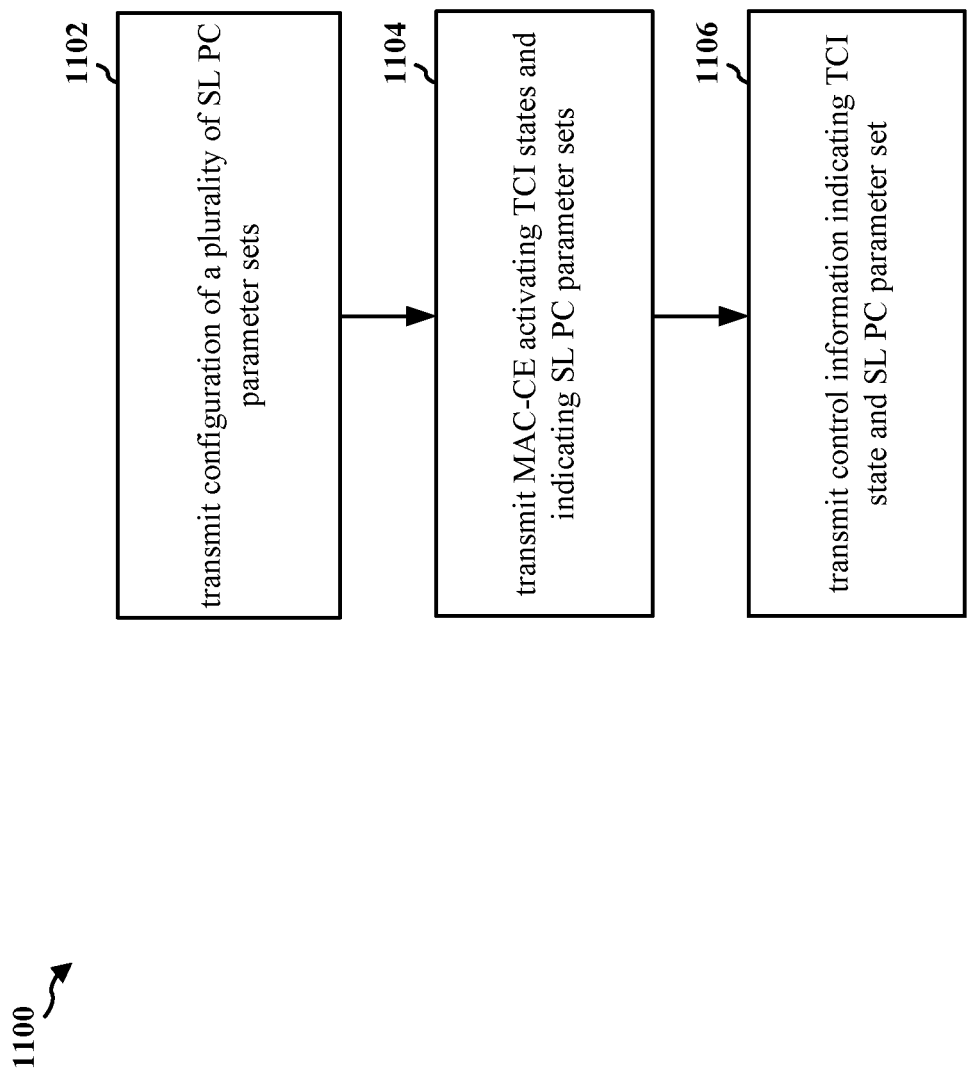
FIG. 11 is a flowchart of a method of wireless communication.

FIG. 11 is a flowchart 1100 of a method of wireless communication. The method may be performed at a configuring UE (e.g., the UE 104; the apparatus 1302; the configuring UE 804b) or a base station (e.g., the base station 102/180/804; the apparatus 1402). The base station or a configuring UE may transmit, to a UE, a configuration of a plurality of sidelink power control parameter sets, a MAC-CE activating TCI states and indicating sidelink power control parameter sets, and control information indicating a TCI state and a sidelink power control parameter set.

At 1102, the base station 804a or the configuring UE may configure a plurality of sidelink power control parameter sets and a plurality of TCI states for a UE to communicate via sidelink. The one or more sidelink power control parameter sets may be updated or activated from the plurality of sidelink power control parameter sets configured for the UE based on the at least one MAC-CE. The configuration of the plurality of sidelink parameter sets may include the parameter values corresponding to each of the IDs included in the power control parameter set configured by the Uu interface between the UE and the base station or the sidelink communication between UEs. For example, at 806, the base station 804a or the configuring UE 804b may configure a plurality of sidelink power control parameter sets and a plurality of TCI states for a UE to communicate via sidelink. Furthermore, 1102 may be performed by a sidelink power control parameter configuring component 1340 or 1440.

At 1104, the base station 804a or the configuring UE may transmit, to the UE, at least one MAC-CE activating one or more of the plurality of TCI states and one or more sidelink power control parameter sets of the plurality of sidelink power control parameter sets. In one aspect, the at least one MAC-CE may be transmitted from the configuring UE 804b, and the UE 802 may receive the at least one MAC-CE in a PSSCH. In another aspect, the at least one MAC-CE may be transmitted from the base station 804a, and the UE 802 may receive the at least one MAC-CE in a PDSCH. In one aspect, the at least one MAC-CE may be a joint MAC-CE that activates the one or more TCI states and indicate the one or more sidelink power control parameter sets. In another aspect, the at least one MAC-CE may include a first MAC-CE activating the one or more TCI states and a second MAC-CE indicating the one or more sidelink power control parameter sets. For example, at 808, the base station 804a or the configuring UE 804b may transmit, to the UE 802, at least one MAC-CE activating one or more of the plurality of TCI states and one or more sidelink power control parameter sets of the plurality of sidelink power control parameter sets. Furthermore, 1104 may be performed by a MAC-CE component 1342 or 1442.

In some aspects, each sidelink power control parameter set may be indicated with a sidelink power control parameter ID that is associated with at least one of a sidelink power control parameter set ID, a sidelink power control pathloss reference signal ID, a sidelink p0 ID, or a sidelink alpha ID. That is, the power control parameter set may include plurality of power control parameter IDs including at least one of a sidelink pathloss reference signal Id (e.g., sl-pathlossReferenceRS-Id), a sidelink p0 ID (e.g., sl-p0-Id), or a sidelink alpha Id (e.g., sl-alpha-ID). Each of the plurality of power control parameter IDs may correspond to a plurality of power control parameter values. That is, the sidelink pathloss reference signal Id (e.g., sl-pathlossReferenceRS-Id) may indicate the sidelink pathloss reference signal parameter value, the sidelink p0 ID may indicate the sidelink p0 parameter value, and the sidelink alpha Id may indicate the sidelink alpha parameter value. Here, at 806, the parameter values corresponding to each of the IDs included in the power control parameter set may be configured by the Uu interface between the UE and the base station or the sidelink communication between UEs.

At 1106, the base station or the configuring UE may transmit control information indicating a TCI state and a power control parameter set from the at least one MAC-CE. The base station or the configuring UE may transmit the control information indicating a TCI state and a power control parameter set from the at least one MAC-CE. In one aspect, the control information may include a codepoint that indicates the TCI state from the one or more TCI states activated by the at least one MAC-CE and indicates the power control parameter set from the one or more sidelink power control parameter sets indicated in the at least one MAC-CE. In one aspect, the control information may be transmitted from the configuring UE, and the UE may receive the control information in SCI. In another aspect, the control information may be transmitted from the base station, and the UE may receive the control information in DCI. For example, at 810, the base station 804a or the configuring UE 804b may transmit control information indicating a TCI state and a power control parameter set from the at least one MAC-CE. Furthermore, 1106 may be performed by a control information component 1344 or 1444.

Figure 12:
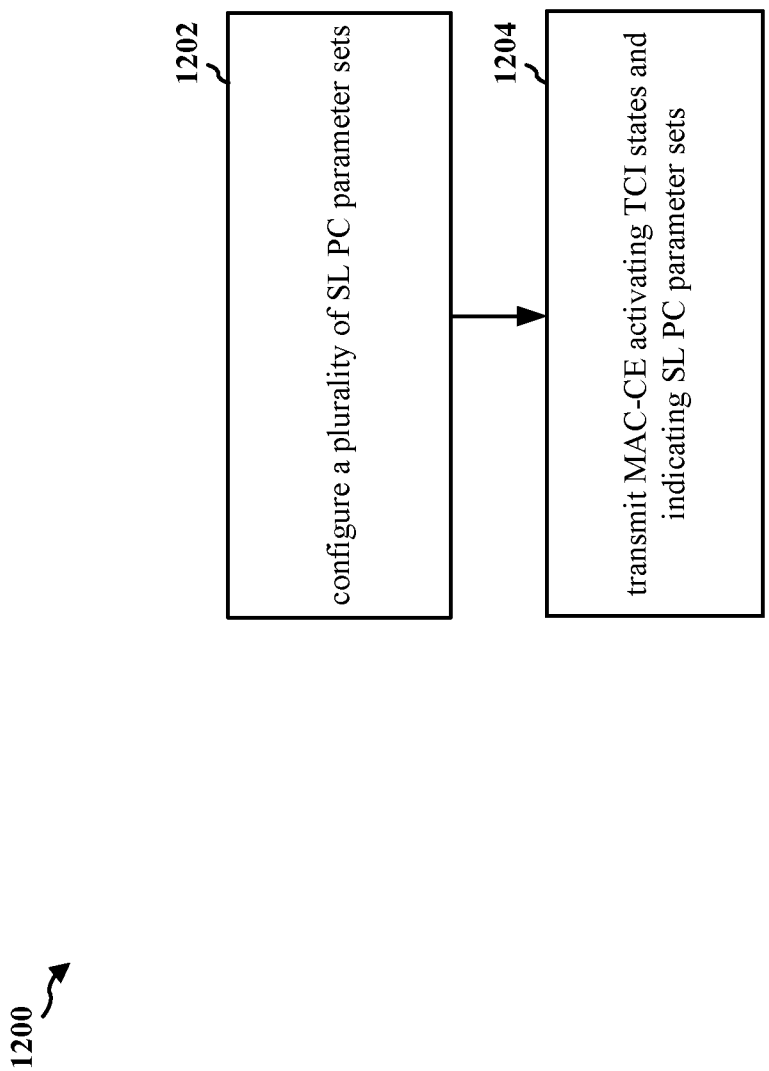
FIG. 12 is a flowchart of a method of wireless communication.

FIG. 12 is a flowchart 1200 of a method of wireless communication. The method may be performed by a configuring UE (e.g., the UE 104; the apparatus 1302; the configuring UE 804b) or a base station (e.g., the base station 102/180/804; the apparatus 1402). The base station or a configuring UE may transmit, to a UE, a configuration of a plurality of sidelink power control parameter sets, a MAC-CE activating TCI states and indicating sidelink power control parameter sets, and control information indicating a TCI state and a sidelink power control parameter set.

At 1202, the base station 804a or the configuring UE may configure a plurality of sidelink power control parameter sets and a plurality of TCI states for a UE to communicate via sidelink. The one or more sidelink power control parameter sets may be updated or activated from the plurality of sidelink power control parameter sets configured for the UE based on the at least one MAC-CE. The configuration of the plurality of sidelink parameter sets may include the parameter values corresponding to each of the IDs included in the power control parameter set configured by the Uu interface between the UE and the base station or the sidelink communication between UEs. For example, at 806, the base station 804a or the configuring UE 804b may configure a plurality of sidelink power control parameter sets and a plurality of TCI states for a UE to communicate via sidelink. Furthermore, 1202 may be performed by a sidelink power control parameter configuring component 1340 or 1440.

At 1204, the base station 804a or the configuring UE may transmit, to the UE, at least one MAC-CE activating one or more of the plurality of TCI states and one or more sidelink power control parameter sets of the plurality of sidelink power control parameter sets. In one aspect, the at least one MAC-CE may be transmitted from the configuring UE 804b, and the UE 802 may receive the at least one MAC-CE in a PSSCH. In another aspect, the at least one MAC-CE may be transmitted from the base station 804a, and the UE 802 may receive the at least one MAC-CE in a PDSCH. In one aspect, the at least one MAC-CE may be a joint MAC-CE that activates the one or more TCI states and indicate the one or more sidelink power control parameter sets. In another aspect, the at least one MAC-CE may include a first MAC-CE activating the one or more TCI states and a second MAC-CE indicating the one or more sidelink power control parameter sets. For example, at 808, the base station 804a or the configuring UE 804b may transmit, to the UE 802, at least one MAC-CE activating one or more of the plurality of TCI states and one or more sidelink power control parameter sets of the plurality of sidelink power control parameter sets. Furthermore, 1204 may be performed by a MAC-CE component 1342 or 1442.

In some aspects, each sidelink power control parameter set may be indicated with a sidelink power control parameter ID that is associated with at least one of a sidelink power control parameter set ID, a sidelink power control pathloss reference signal ID, a sidelink p0 ID, or a sidelink alpha ID. That is, the power control parameter set may include plurality of power control parameter IDs including at least one of a sidelink pathloss reference signal Id (e.g., sl-pathlossReferenceRS-Id), a sidelink p0 ID (e.g., sl-p0-Id), or a sidelink alpha Id (e.g., sl-alpha-ID). Each of the plurality of power control parameter IDs may correspond to a plurality of power control parameter values. That is, the sidelink pathloss reference signal Id (e.g., sl-pathlossReferenceRS-Id) may indicate the sidelink pathloss reference signal parameter value, the sidelink p0 ID may indicate the sidelink p0 parameter value, and the sidelink alpha Id may indicate the sidelink alpha parameter value. Here, at 806, the parameter values corresponding to each of the IDs included in the power control parameter set may be configured by the Uu interface between the UE and the base station or the sidelink communication between UEs.

Figure 13:
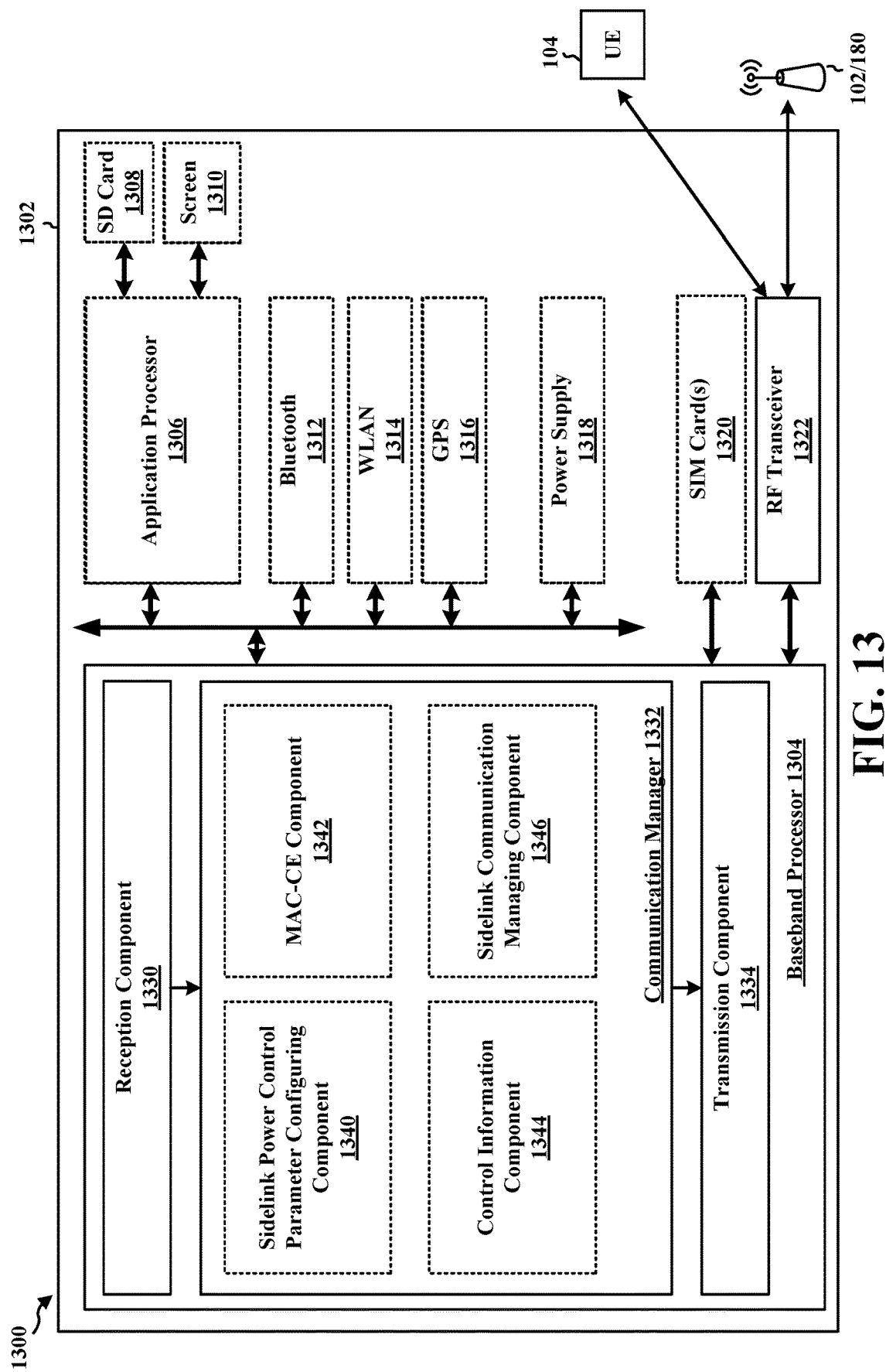
FIG. 13 is a diagram illustrating an example of a hardware implementation for an example apparatus.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a baseband processor 1304 (also referred to as a modem) coupled to an RF transceiver 1322. In some aspects, the baseband processor may be a cellular baseband processor and the RF transceiver may be a cellular RF transceiver. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The baseband processor 1304 communicates through the RF transceiver 1322 with the UE 104 and/or BS 102/180. The baseband processor 1304 may include a computer-readable medium/memory. The computer-readable medium/memory may be non-transitory. The baseband processor 1304 is responsible for general processing, including the execution of software stored on the computer-readable medium/memory. The software, when executed by the baseband processor 1304, causes the baseband processor 1304 to perform the various functions described supra. The computer-readable medium/memory may also be used for storing data that is manipulated by the baseband processor 1304 when executing software. The baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband processor 1304. The baseband processor 1304 may be a component of the device 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see the device 350 of FIG. 3) and include the additional modules of the apparatus 1302.

The communication manager 1332 includes a sidelink power control parameter configuring component 1340 that is configured to transmit or receive a configuration of a plurality of sidelink power control parameter sets, e.g., as described in connection with 902, 1002, 1102, and 1202. The communication manager 1332 further includes a MAC-CE component 1342 that is configured to transmit or receive at least one MAC-CE activating one or more TCI states and indicating one or more sidelink power control parameter sets, e.g., as described in connection with 904, 1004, 1104, and 1204. The communication manager 1332 includes a control information component 1344 that is configured to transmit or receive control information indicating a TCI state and a power control parameter set from the at least one MAC-CE, e.g., as described in connection with 906, 1006, 1106, and 1206. The communication manager 1332 further includes a sidelink communication managing component 1346 that is configured to transmit sidelink communication in a direction based on the TCI state indicated in the control information and with a transmission power based on the sidelink power control parameter set indicated in the control information, e.g., as described in connection with 908, and 1008.

The apparatus may include additional components that perform each of the blocks of the algorithm in the flowcharts of FIGS. 9 and 10, and/or the aspects performed by the UE in FIG. 8. As such, each block in the flowcharts of FIGS. 9 and 10, and/or the aspects performed by the UE in FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband processor 1304, includes means for transmitting or receiving a configuration of a plurality of sidelink power control parameter sets, means for transmitting or receiving at least one MAC-CE activating one or more TCI states and indicating one or more sidelink power control parameter sets, means for transmitting or receiving control information indicating a TCI state and a power control parameter set from the at least one MAC-CE, and means for transmitting sidelink communication in a direction based on the TCI state indicated in the control information and with a transmission power based on the power control parameter set indicated in the control information. The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 14:
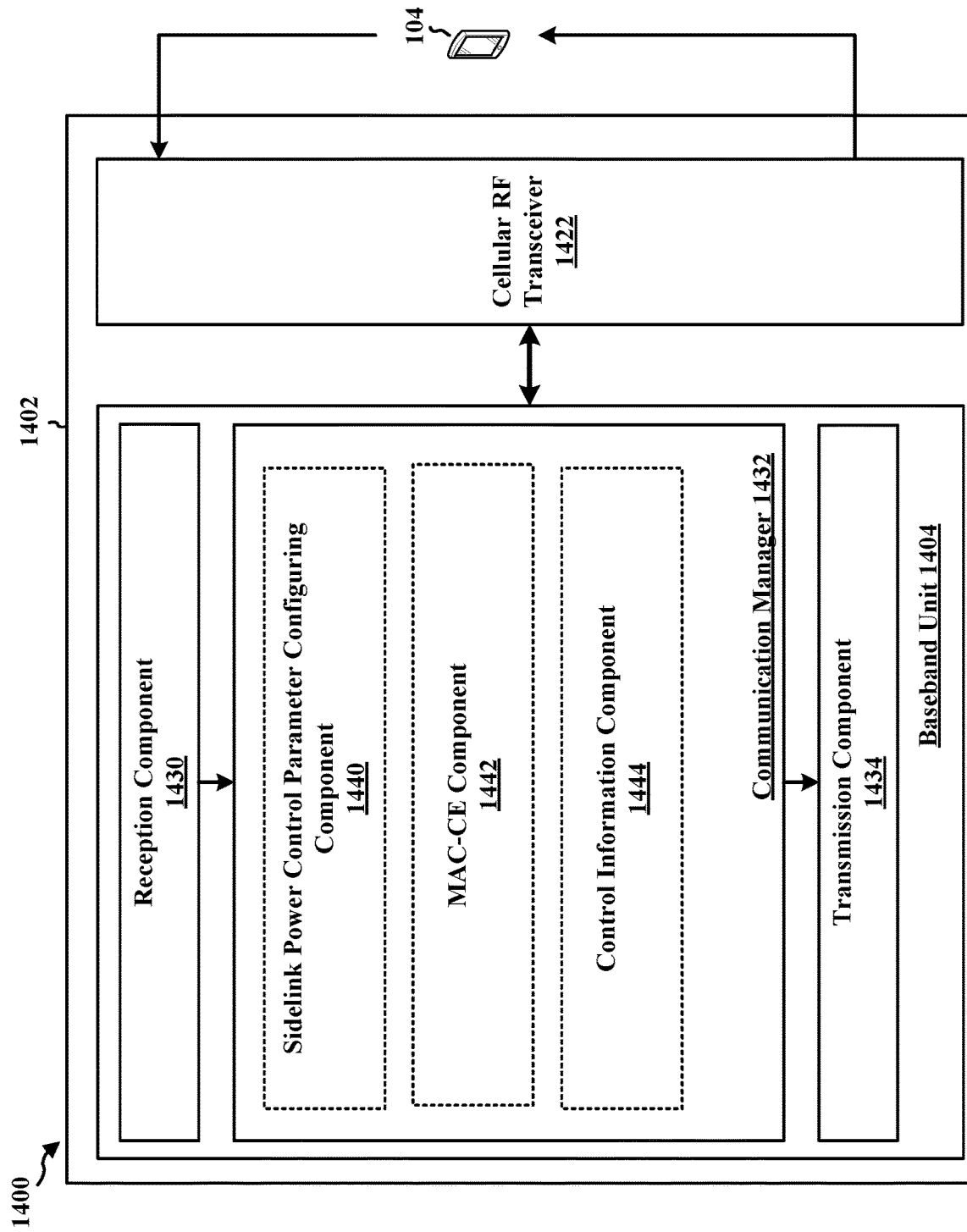
FIG. 14 is a diagram illustrating an example of a hardware implementation for an example apparatus.

FIG. 14 is a diagram 1400 illustrating an example of a hardware implementation for an apparatus 1402. In some aspects, the apparatus 1402 may be a base station, a component of a base station, or may implement base station functionality. In some aspects, the apparatus 1402 may be a UE (e.g., a configuring UE), a component of a UE, or may implement UE functionality. In some aspects, the apparatus 1302 may include a baseband unit 1404. The baseband unit 1404 may communicate through a RF transceiver 1422 with the UE 104. The RF transceiver may be a cellular RF transceiver, in some aspects. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the device 310 and may include the memory 376 and/or at least one of the TX processor 316, the RX processor 370, and the controller/processor 375.

The communication manager 1432 includes a sidelink power control parameter configuring component 1440 that is configured to transmit at least one MAC-CE activating one or more TCI states and indicating one or more sidelink power control parameter sets, e.g., as described in connection with 1102 and 1202. The communication manager 1432 further includes a MAC-CE component 1442 that is configured to transmit at least one MAC-CE activating one or more TCI states and indicating one or more sidelink power control parameter sets, e.g., as described in connection with 1104 and 1204. The communication manager 1432 further includes a control information component 1444 that is configured to transmit control information indicating a TCI state and a power control parameter set from the at least one MAC-CE, e.g., as described in connection with 1106 and 1206.

The apparatus may include additional components that perform each of the blocks of the algorithm in the flowcharts of FIGS. 11, 12, and/or the aspects performed by the base station/configuring UE in FIG. 8. As such, each block in the flowcharts of FIGS. 11, 12, and/or the aspects performed by the base station/configuring UE in FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for configuring a plurality of sidelink power control parameter sets and a plurality of TCI states for a UE to communicate via sidelink, means for transmitting, to the UE, at least one MAC-CE activating one or more of the plurality of TCI states and one or more sidelink power control parameter sets of the plurality of sidelink power control parameter sets, and means for transmitting control information indicating a TCI state and a power control parameter set from the at least one MAC-CE. The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

A UE may receive, from at least one of a base station or a configuring UE, a configuration of a plurality of sidelink power control parameter sets, a MAC-CE activating TCI states and indicating sidelink power control parameter sets, and control information indicating a TCI state and a sidelink power control parameter set. The UE may transmit the sidelink communication in a direction based on the TCI state and with a transmission power indicated in the control information. The MAC-CE may include a joint MAC-CE or separate MAC-CEs to update or configuration of the sidelink TCI and the power control parameters.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication including receiving at least one MAC-CE activating one or more TCI states and indicating one or more sidelink power control parameter sets, receiving control information indicating a TCI state and a power control parameter set from the at least one MAC-CE, and transmitting sidelink communication in a direction based on the TCI state indicated in the control information and with a transmission power based on the sidelink power control parameter set indicated in the control information.

Aspect 2 is the method of aspect 1, further including receiving a configuration of a plurality of sidelink power control parameter sets, where the one or more sidelink power control parameter sets are updated or activated from the plurality of sidelink power control parameter sets configured for the UE based on the at least one MAC-CE.

Aspect 3 is the method of any of aspects 1 and 2, where the control information includes a codepoint that indicates the TCI state from the one or more TCI states activated by the at least one MAC-CE and indicates the power control parameter set from the one or more sidelink power control parameter sets indicated in the at least one MAC-CE.

Aspect 4 is the method of any of aspects 1 to 3, where the at least one MAC-CE is in a PSSCH, and the control information includes SCI.

Aspect 5 is the method of any of aspects 1 to 4, where the at least one MAC-CE is in a PDSCH from a base station, and the control information includes DCI from the base station.

Aspect 6 is the method of any of aspects 1 to 5, where each sidelink power control parameter set is indicated with a sidelink power control parameter ID that is associated with at least one of a sidelink power control parameter set ID, a sidelink power control pathloss reference signal ID, a sidelink p0 ID, or a sidelink alpha ID.

Aspect 7 is the method of any of aspects 1 to 6, where the at least one MAC-CE is a joint MAC-CE that activates the one or more TCI states and indicates the one or more sidelink power control parameter sets.

Aspect 8 is the method of any of aspects 1 to 7, where the at least one MAC-CE includes a first MAC-CE activating the one or more TCI states and a second MAC-CE indicating the one or more sidelink power control parameter sets.

Aspect 9 is an apparatus for wireless communication including memory and at least one processor configured to implement the method any of aspects 1 to 8.

Aspect 10 is the apparatus of aspect 9, further including at least one antenna, and a transceiver coupled to the at least one antenna and the at least one processor.

Aspect 11 is an apparatus for wireless communication including means for implementing any of aspects 1 to 8.

Aspect 12 is a computer-readable medium storing computer executable code, where the code when executed by a processor causes the processor to implement any of aspects 1 to 8.

Aspect 13 is a method of wireless communication including configuring a plurality of sidelink power control parameter sets and a plurality of TCI states for a UE to communicate via sidelink, and transmitting, to the UE, at least one MAC-CE activating one or more of the plurality of TCI states and one or more sidelink power control parameter sets of the plurality of sidelink power control parameter sets.

Aspect 14 is the method of aspect 13, further including transmitting control information indicating a TCI state and a power control parameter set from the at least one MAC-CE.

Aspect 15 is the method of aspect 14, where the control information includes a codepoint that indicates the TCI state from the one or more TCI states activated by the at least one MAC-CE and indicates the power control parameter set from the one or more power control parameter sets indicated in the at least one MAC-CE.

Aspect 16 is the method of any of aspects 14 and 15, where the MAC-CE is in a PDSCH from a base station, and the control information includes DCI.

Aspect 17 is the method of any of aspects 14 to 16, where the MAC-CE is in a PSSCH, and the control information includes SCI.

Aspect 18 is the method of any of aspects 13 to 17, where each sidelink power control parameter set is indicated with a sidelink power control parameter ID that is associated with at least one of a sidelink power control parameter set ID, a sidelink power control pathloss reference signal ID, a sidelink p0 ID, or a sidelink alpha ID.

Aspect 19 is the method of any of aspects 13 to 18, where the MAC-CE is a joint MAC-CE further that activates the one or more TCI states and indicates the one or more sidelink power control parameter sets.

Aspect 20 is the method of any of aspects 13 to 19, where the at least one MAC-CE includes a first MAC-CE activating the one or more TCI states and a second MAC-CE indicating the one or more sidelink power control parameter sets.

Aspect 21 is an apparatus for wireless communication including memory and at least one processor configured to implement the method of any of aspects 13 to 20.

Aspect 22 is the apparatus of aspect 21, further including at least one antenna, and a transceiver coupled to the at least one antenna and the at least one processor.

Aspect 23 is an apparatus for wireless communication including means for implementing any of aspects 13 to 20.

Aspect 24 is a computer-readable medium storing computer executable code, where the code when executed by a processor causes the processor to implement any of aspects 13 to 20.

What is claimed is:

1. An apparatus for wireless communication at a user equipment (UE), comprising:
    a memory; and
    at least one processor coupled to the memory, the at least one processor and the memory configured to:
        receive at least one media access control (MAC) control element (CE) (MAC-CE) activating one or more transmission configuration indicator (TCI) states and indicating one or more sidelink power control parameter sets;
        receive control information indicating a TCI state and a sidelink power control parameter set from the at least one MAC-CE; and
        transmit sidelink communication in a direction based on the TCI state indicated in the control information and with a transmission power based on the sidelink power control parameter set indicated in the control information.

2. The apparatus of claim 1, wherein the at least one processor and the memory are further configured to:
    receive a configuration of a plurality of sidelink power control parameter sets, wherein the one or more sidelink power control parameter sets are updated or activated from the plurality of sidelink power control parameter sets configured for the UE based on the at least one MAC-CE.

3. The apparatus of claim 1, wherein the control information comprises a codepoint that indicates the TCI state from the one or more TCI states activated by the at least one MAC-CE and indicates the sidelink power control parameter set from the one or more sidelink power control parameter sets indicated in the at least one MAC-CE.

4. The apparatus of claim 1, wherein the at least one MAC-CE is in a physical sidelink shared channel (PSSCH), and the control information comprises sidelink control information (SCI).

5. The apparatus of claim 1, wherein the at least one MAC-CE is in a physical downlink shared channel (PDSCH) from a base station, and the control information comprises downlink control information (DCI) from the base station.

6. The apparatus of claim 1, wherein each sidelink power control parameter set is indicated with a sidelink power control parameter identifier (ID) that is associated with at least one of a sidelink power control parameter set ID, a sidelink power control pathloss reference signal ID, a sidelink p0 ID, or a sidelink alpha ID.

7. The apparatus of claim 1, wherein the at least one MAC-CE is a joint MAC-CE that activates the one or more TCI states and indicates the one or more sidelink power control parameter sets.

8. The apparatus of claim 1, wherein the at least one MAC-CE includes a first MAC-CE activating the one or more TCI states and a second MAC-CE indicating the one or more sidelink power control parameter sets.

9. The apparatus of claim 1, further comprising:
at least one antenna; and
a transceiver coupled to the at least one antenna and the at least one processor.

10. An apparatus for wireless communication, comprising:
a memory; and
at least one processor coupled to the memory, the at least one processor and the memory configured to:
configure a plurality of sidelink power control parameter sets and a plurality of transmission configuration indicator (TCI) states for a user equipment (UE) to communicate via sidelink; and
transmit, to the UE, at least one media access control (MAC) control element (CE) (MAC-CE) activating one or more of the plurality of TCI states and one or more sidelink power control parameter sets of the plurality of sidelink power control parameter sets.

11. The apparatus of claim 10, wherein the memory and the at least one processor are further configured to:
transmit control information indicating a TCI state and a power control parameter set from the at least one MAC-CE.

12. The apparatus of claim 11, wherein the control information comprises a codepoint that indicates the TCI state from the one or more of the plurality of TCI states activated by the at least one MAC-CE and indicates the power control parameter set from the one or more sidelink power control parameter sets indicated in the at least one MAC-CE.

13. The apparatus of claim 11, wherein the MAC-CE is in a physical downlink shared channel (PDSCH) from a base station, and the control information comprises downlink control information (DCI).

14. The apparatus of claim 11, wherein the MAC-CE is in a physical sidelink shared channel (PSSCH), and the control information comprises sidelink control information (SCI).

15. The apparatus of claim 10, wherein each sidelink power control parameter set is indicated with a sidelink power control parameter identifier (ID) that is associated with at least one of a sidelink power control parameter set ID, a sidelink power control pathloss reference signal ID, a sidelink p0 ID, or a sidelink alpha ID.

16. The apparatus of claim 10, wherein the MAC-CE is a joint MAC-CE further that activates the one or more of the plurality of TCI states and indicates the one or more sidelink power control parameter sets.

17. The apparatus of claim 10, wherein the at least one MAC-CE includes a first MAC-CE activating the one or more of the plurality of TCI states and a second MAC-CE indicating the one or more sidelink power control parameter sets.

18. The apparatus of claim 10, further comprising:
at least one antenna; and
a transceiver coupled to the at least one antenna and the at least one processor.

19. A method for wireless communication at a user equipment (UE), comprising:
receiving at least one media access control (MAC) control element (CE) (MAC-CE) activating one or more transmission configuration indicator (TCI) states and indicating one or more sidelink power control parameter sets;
receiving control information indicating a TCI state and a sidelink power control parameter set from the at least one MAC-CE; and
transmitting sidelink communication in a direction based on the TCI state indicated in the control information and with a transmission power based on the sidelink power control parameter set indicated in the control information.

20. The method of claim 19, further comprising:
receiving a configuration of a plurality of sidelink power control parameter sets, wherein the one or more sidelink power control parameter sets are updated or activated from the plurality of sidelink power control parameter sets configured for the UE based on the at least one MAC-CE.

21. The method of claim 19, wherein the control information comprises a codepoint that indicates the TCI state from the one or more TCI states activated by the at least one MAC-CE and indicates the power control parameter set from the one or more sidelink power control parameter sets indicated in the at least one MAC-CE.

22. The method of claim 19, wherein each sidelink power control parameter set is indicated with a sidelink power control parameter identifier (ID) that is associated with at least one of a sidelink power control parameter set ID, a sidelink power control pathloss reference signal ID, a sidelink p0 ID, or a sidelink alpha ID.

23. The method of claim 19, wherein the at least one MAC-CE is a joint MAC-CE that activates the one or more TCI states and indicates the one or more sidelink power control parameter sets.

24. The method of claim 19, wherein the at least one MAC-CE includes a first MAC-CE activating the one or more TCI states and a second MAC-CE indicating the one or more sidelink power control parameter sets.

25. A method for wireless communication, comprising:
configuring a plurality of sidelink power control parameter sets and a plurality of transmission configuration indicator (TCI) states for a user equipment (UE) to communicate via sidelink; and
transmitting, to the UE, at least one media access control (MAC) control element (CE) (MAC-CE) activating one or more of the plurality of TCI states and one or more sidelink power control parameter sets of the plurality of sidelink power control parameter sets.

26. The method of claim 25, further comprising:
transmitting control information indicating a TCI state and a power control parameter set from the at least one MAC-CE.

27. The method of claim 26, wherein the control information comprises a codepoint that indicates the TCI state from the one or more of the plurality of TCI states activated by the at least one MAC-CE and indicates the power control parameter set from the one or more sidelink power control parameter sets indicated in the at least one MAC-CE.

28. The method of claim 25, wherein each sidelink power control parameter set is indicated with a sidelink power control parameter identifier (ID) that is associated with at least one of a sidelink power control parameter set ID, a sidelink power control pathloss reference signal ID, a sidelink p0 ID, or a sidelink alpha ID.

29. The method of claim 25, wherein the MAC-CE is a joint MAC-CE further that activates the one or more of the plurality of TCI states and indicates the one or more sidelink power control parameter sets.

30. The method of claim 25, wherein the at least one MAC-CE includes a first MAC-CE activating the one or more of the plurality of TCI states and a second MAC-CE indicating the one or more sidelink power control parameter sets.

\* \* \* \* \*